United States Patent
Okuno

(10) Patent No.: US 12,506,855 B2
(45) Date of Patent: Dec. 23, 2025

(54) PROJECTION TYPE IMAGE DISPLAY DEVICE

(71) Applicant: PANASONIC HOLDINGS CORPORATION, Osaka (JP)

(72) Inventor: Manabu Okuno, Osaka (JP)

(73) Assignee: PANASONIC PROJECTOR & DISPLAY CORPORATION, Osaka (JP)

(*) Notice: Subject to any disclaimer, the term of this patent is extended or adjusted under 35 U.S.C. 154(b) by 0 days.

(21) Appl. No.: 19/056,046

(22) Filed: Feb. 18, 2025

(65) Prior Publication Data

US 2025/0193364 A1 Jun. 12, 2025

Related U.S. Application Data

(63) Continuation of application No. PCT/JP2023/028005, filed on Jul. 31, 2023.

(30) Foreign Application Priority Data

Aug. 18, 2022 (JP) .................................. 2022-130789

(51) Int. Cl.
H04N 13/324 (2018.01)
H04N 13/344 (2018.01)

(52) U.S. Cl.
CPC ......... *H04N 13/324* (2018.05); *H04N 13/344* (2018.05)

(58) Field of Classification Search
None
See application file for complete search history.

(56) References Cited

U.S. PATENT DOCUMENTS

2016/0187644 A1* 6/2016 Bhakta ............... F21V 7/28
   359/292
2018/0129124 A1* 5/2018 Hu .................. G03B 21/208
   (Continued)

FOREIGN PATENT DOCUMENTS

CA   3031771 A1 *  2/2018 ............. G16H 20/40
CA   3063709 A1 * 11/2018 ............. H05B 45/20
   (Continued)

OTHER PUBLICATIONS

International Preliminary Report on Patentability and Written Opinion of the International Search Authority issued on Feb. 27, 2025 in corresponding International (PCT) Application No. PCT/JP2023/028005.
(Continued)

*Primary Examiner* — Ricky Chin
(74) *Attorney, Agent, or Firm* — Wenderoth, Lind & Ponack, L.L.P.

(57) ABSTRACT

A spectroscopic 3D image display device according to the present disclosure includes: at least one first projection type image display device that uses first illumination light to display an image; at least one second projection type image display device that uses second illumination light to display an image; and a system controller that carries out control so that the first and second projection type image display devices are synchronously driven. A light source device of the first projection type image display device emits, with prescribed output power, first blue light having the central wavelength $\lambda a$, and switches the intensity of the output power and emits third blue light. A light source device of the second projection type image display device emits, with prescribed output power, second blue light having the central wavelength $\lambda b$. The central wavelengths $\lambda a$, $\lambda b$, and $\lambda c$ satisfy $\lambda b \leq \lambda c < \lambda a$.

10 Claims, 11 Drawing Sheets

(56) References Cited

U.S. PATENT DOCUMENTS

2019/0384152 A1* 12/2019 Lippey ............... G03B 21/2033
2025/0193364 A1* 6/2025 Okuno ................ H04N 13/344

FOREIGN PATENT DOCUMENTS

| CN | 104052989 | | 9/2014 | |
|---|---|---|---|---|
| CN | 104935907 A | * | 9/2015 | ........... H04N 13/334 |
| JP | 2016-142820 | | 8/2016 | |
| JP | 2018-513995 | | 5/2018 | |
| JP | 2019-537742 | | 12/2019 | |
| WO | WO-2017066556 A1 | * | 4/2017 | ........... G02B 27/283 |
| WO | WO-2017139667 A1 | * | 8/2017 | ........... H04N 13/383 |
| WO | WO-2018064194 A1 | * | 4/2018 | ............. G02B 30/23 |
| WO | WO-2024015217 A1 | * | 1/2024 | ......... G02B 27/4272 |

OTHER PUBLICATIONS

International Search Report issued Oct. 10, 2023 in corresponding International Application No. PCT/JP2023/028005.

* cited by examiner

PROJECTION TYPE IMAGE DISPLAY DEVICE

CROSS REFERENCE TO RELATED APPLICATION

This is a continuation application of International Application No. PCT/JP2023/028005 with an international filing date of Jul. 31, 2023, which claims priority of Japanese Patent Application No. 2022-130789 filed on Aug. 18, 2022, the content of which is incorporated herein by reference.

TECHNICAL FIELD

The present disclosure relates to a projection type image display device, and more particularly, to a spectroscopic 3D image display device.

BACKGROUND

Up until now, a projection type image display device capable of displaying stereoscopic images has been proposed. For example, JP 2019-537742 A discloses a spectroscopic 3D image display device. This type of spectroscopic 3D image display device has, for example, a configuration as conceptually shown in FIG. 8. FIG. 8 is a conceptual plan view showing the configuration of a spectroscopic 3D image display device. As shown in the figure, a spectroscopic 3D image display device 101 includes two projectors 101a and 101b. The projectors 101a and 101b are configured to project a left-eye image and a right-eye image of the viewer on the same screen 103 in a superimposed manner. The projector 101a generates a left-eye image using colored light in two or more color bands, having wavelengths RL (red light), GL (green light), and BL (blue light). The projector 101b generates a right-eye image using colored light having wavelengths RR (red light), GR (green light), and BR (blue light) different from the colored light having the wavelengths RL, GL, and Bl for generating the left-eye image.

The viewer sees through 3D glasses 105 configured such that a left-eye lens 105a does not pass an image projected by the projector 101b and such that a right-eye lens 105b does not pass an image projected by the projector 101a. This allows an image on the screen 103 to be recognized as a stereoscopic image due to the binocular parallax. In such a spectroscopic 3D image display device, two or more projection type image display devices (projectors) are used, and in order to achieve a good viewing quality, uniformity in the luminance of the light forming images is required for each projection type image display device.

In the projection type image display device, to obtain each colored light for generating an image, a blue laser light source is used so that blue light output from the light source is irradiated on a phosphor as excitation light to cause the phosphor to emit light, whereby colored light such as red light and green light can be obtained.

In the spectroscopic 3D image display device as disclosed in JP 2019-537742 A, the two projection type image display devices generating an image for both eyes are configured using light sources whose emitted light wavelengths have a predetermined wavelength difference, for example, laser light sources that emit blue light with a central wavelength of 465 nm and blue light with a central wavelength of 445 nm. However, phosphors used to generate colored light such as red light and green light have different luminous efficiencies depending on the wavelength of the blue light used as excitation light. FIG. 9 is a graph showing an example of the change in fluorescence yield depending on the excitation wavelength of phosphors used in a projection type image display device, and shows fluorescence yields at excitation wavelengths with two kinds of phosphors F1 and F2.

As shown in FIG. 9, the phosphor F1 and the phosphor F2 both have a fluorescence yield Yb of approx. 99% in the vicinity of the excitation wavelength of 445 nm. On the other hand, in the vicinity of the excitation wavelength of 465 nm, fluorescence yields Ya1 and Ya2 of the phosphors F1 and F2 are approx. 92% and 87%, respectively, which remarkably drop as compared with the fluorescence yield Yb in the vicinity of the excitation wavelength 445 nm. As a result, in the two projection type image display devices, the projection type image display device configured using a blue laser light source with a central wavelength of 465 nm undergoes a decrease in the luminance of the light forming an image due to a decrease in the luminance efficiency of colored light such as red light and green light. Thus, in such a spectroscopic 3D image display device, due to the difference in the fluorescence yield of the phosphors caused by the difference in the wavelength of the emitted light from the light sources between the projection type image display devices that generate an image for two eyes, non-uniformity in the luminance occurs between the light forming images for two eyes, and thus affect the viewing quality.

SUMMARY

The present disclosure is aimed to solve the above problem and provide a spectroscopic 3D image display device capable of improving the luminance uniformity of light forming images for both eyes. The spectroscopic 3D image display devices may include, for example, spectroscopic 3D video display devices.

In order to address the issue described above, the present disclosure provides a spectroscopic 3D image display device. A spectroscopic 3D image display device according to one aspect of the present disclosure includes: at least one first projection type image display device that projects a first image onto a projection target by using first illumination light including colored light of two or more color bands; at least one second projection type image display device that projects a second image onto the projection target by using second illumination light including colored light of two or more color bands each having a wavelength different from wavelengths of the first illumination light, the second projection type image display device projecting the second image superimposed on the first image; and a system controller configured to control the first projection type image display device and the second projection type image display device. Each of the first projection type image display device and the second projection type image display device includes: a light source device that emits blue light; a light modulation element that spatially modulates incident colored light of two or more color bands in accordance with an image signal, to generate projection light corresponding to the image signal; an illumination optical system that allows blue light emitted from the light source device to pass through and creates fluorescent light excited by the light emitted from the light source device, the illumination optical system outputting and directing the blue light and the fluorescent light to the light modulation element in a time-division manner; and a projection optical system that magnifies and projects the projection light from the light modulation element onto the projection object, to display an image thereon. The light source device of the first projection type image display device is configured to emit a first blue light having a central wavelength $\lambda a$ and at least one third blue light having a central wavelength $\lambda c$, the light source device of the second projection type image display device is configured to emit a second blue light having a central wavelength $\lambda b$, the central wavelengths $\lambda a$, $\lambda b$, and $\lambda c$ satisfying $\lambda b \leq \lambda c < \lambda a$. The system controller is configured to cause the light source devices to emit both the first blue light and the second blue light at a predetermined output power, and to cause the light source devices to emit the third blue light at a first output power that is lower than the output power of the first blue light and the second blue light when the illumination optical system outputs the blue light, and to cause the light source devices to emit the third blue light at a second output power that is higher than the first output power when the illumination optical system outputs the fluorescent light.

With the spectroscopic 3D image display device according to one aspect of the present disclosure, it is possible to improve the luminance uniformity of the light forming images for both eyes.

BRIEF DESCRIPTION OF THE DRAWINGS

The present disclosure will become readily understood from the following description of non-limiting and exemplary embodiments thereof made with reference to the accompanying drawings, in which like parts are designated by like reference numeral and in which.

DETAILED DESCRIPTION

Figure 1:
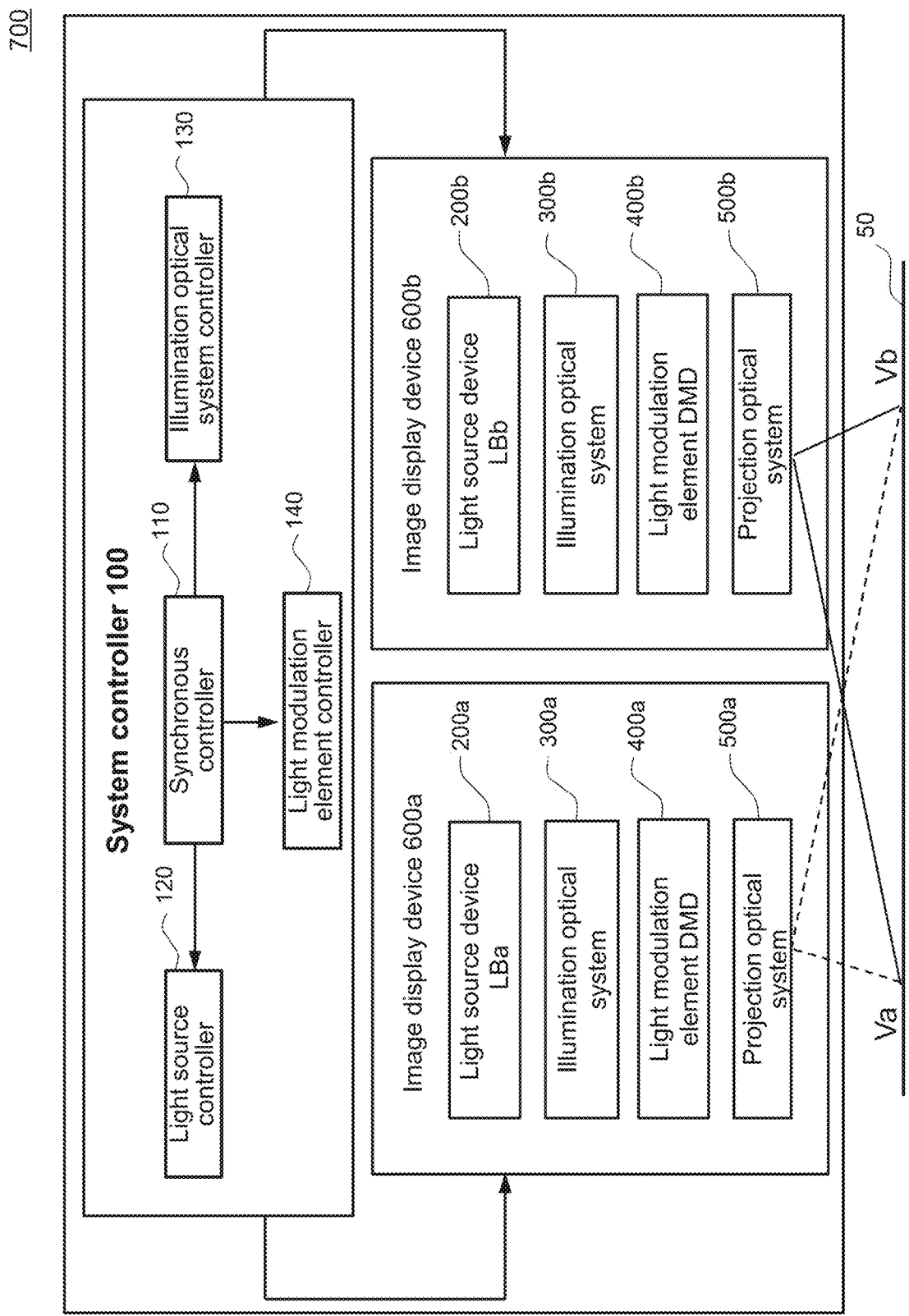
FIG. 1 is a block diagram showing an example of an overall configuration of a spectroscopic 3D image display device according to an embodiment of the present disclosure.

A spectroscopic 3D image display device according to one aspect of the present disclosure includes: at least one first projection type image display device that projects a first image onto a projection target by using first illumination light including colored light of two or more color bands; at least one second projection type image display device that projects a second image onto the projection target by using second illumination light including colored light of two or more color bands each having a wavelength different from wavelengths of the first illumination light, the second projection type image display device projecting the second image superimposed on the first image; and a system controller configured to control the first projection type image display device and the second projection type image display device. Each of the first projection type image display device and the second projection type image display device includes: a light source device that emits blue light; a light modulation element that spatially modulates incident colored light of two or more color bands in accordance with an image signal, to generate projection light corresponding to the image signal; an illumination optical system that allows blue light emitted from the light source device to pass through and creates fluorescent light excited by the light emitted from the light source device, the illumination optical system outputting and directing the blue light and the fluorescent light to the light modulation element in a time-division manner; and a projection optical system that magnifies and projects the projection light from the light modulation element onto the projection object, to display an image thereon. The light source device of the first projection type image display device is configured to emit a first blue light having a central wavelength $\lambda a$ and at least one third blue light having a central wavelength $\lambda c$, the light source device of the second projection type image display device is configured to emit a second blue light having a central wavelength $\lambda b$, the central wavelengths $\lambda a$, $\lambda b$, and $\lambda c$ satisfying $\lambda b \leq \lambda c < \lambda a$. The system controller is configured to cause the light source devices to emit both the first blue light and the second blue light at a predetermined output power, and to cause the light source devices to emit the third blue light at a first output power that is lower than the output power of the first blue light and the second blue light when the illumination optical system outputs the blue light, and to cause the light source devices to emit the third blue light at a second output power that is higher than the first output power when the illumination optical system outputs the fluorescent light.

According to this aspect, it is possible to improve the luminance uniformity of the light forming images for both eyes.

In addition, in a spectroscopic 3D image display device according to another aspect of the present disclosure, the light source device of the second projection type image display device is configured to emit the second blue light having the central wavelength $\lambda b$ and fourth blue light having at least one central wavelength $\lambda d$, the central wavelengths $\lambda a$, $\lambda b$ and $\lambda d$ satisfying $\lambda b < \lambda d \leq \lambda a$. The system controller is configured to cause the light source devices to emit the fourth blue light at a third output power that is lower than the output power of the first blue light and the second blue light when the illumination optical system outputs the blue light, and to cause the light source devices to emit the fourth blue light at a fourth output power that is higher than the third output power when the illumination optical system outputs the fluorescent light.

In addition, in a spectroscopic 3D image display device according to another aspect of the present disclosure, the first output power of the third blue light is less than or equal to 50% of the output power of the first blue light and the second blue light.

In addition, in a spectroscopic 3D image display device according to another aspect of the present disclosure, the light source device of the first projection type image display device is configured to power off the third blue light when the third blue light is emitted at the first output power, and to power on the third blue light when the third blue light is emitted at the second output power.

In addition, in a spectroscopic 3D image display device according to another aspect of the present disclosure, the third output power of the fourth blue light is less than or equal to 50% of the output power of the first blue light and the second blue light.

In addition, in a spectroscopic 3D image display device according to another aspect of the present disclosure, the light source device of the second projection type image display device is configured to power off the fourth blue light when the fourth blue light is emitted at the third output power, and to power on the fourth blue light when the fourth blue light is emitted at the fourth output power.

In addition, in a spectroscopic 3D image display device according to another aspect of the present disclosure, the illumination optical system includes a phosphor wheel. The phosphor wheel includes a first region and a second region that are arranged along a rotation direction, the first region allowing blue light emitted from the light source device to pass through, the second region having a phosphor layer creating the fluorescent light excited by blue light emitted from the light source device. Light emitted from the light source device alternately enters the first region and the second region with rotation of the phosphor wheel. The system controller is configured to cause the light source device to periodically operate in synchronization with the rotation of the phosphor wheel.

In addition, in a spectroscopic 3D image display device according to another aspect of the present disclosure, the illumination optical system includes a spectroscopic element configured to receive light and allow colored light of two or more color bands to pass through in a time-division manner. The spectroscopic element of the first projection type image display device allows colored light of the first illumination light to pass through and reflects colored light of the second illumination light. the spectroscopic element of the second projection type image display device allows colored light of the second illumination light to pass through and reflects colored light of the first illumination light.

In addition, in a spectroscopic 3D image display device according to another aspect of the present disclosure, the spectroscopic elements have wavelength separation coating applied thereto. The wavelength separation coating of the spectroscopic element of the first projection type image display device has a transmittance of 90% or more at or near a wavelength of colored light of each color band of the first illumination light and has a reflectance of 95% or more at or near a wavelength of colored light of each color band of the second illumination light. The wavelength separation coating of the spectroscopic element of the second projection type image display device has a transmittance of 90% or more at or near a wavelength of colored light of each color band of the second illumination light and has a reflectance of 95% or more at or near a wavelength of colored light of each color band of the first illumination light.

In addition, in a spectroscopic 3D image display device according to another aspect of the present disclosure, the illumination optical system further includes a color wheel that receives the blue light and the fluorescent light. The color wheel includes two or more colored light segments arranged along a rotation direction, each of the colored light segments having a dichroic layer that allows colored light of a predetermined color band of incident light to pass through. The blue light and the fluorescent light are sequentially incident on the colored light segments with rotation of the color wheel, and colored light of two or more color bands are allowed to pass through the dichroic layer and be output in a time-division manner.

Any embodiments of the above-described various embodiments may be appropriately combined to achieve the effects of their respective embodiments.

An embodiment will now be described in detail with appropriate reference to the drawings. However, more detailed explanations than necessary may be omitted. For example, detailed explanations of already well-known matters and duplicate explanations for substantially the same configurations may be omitted. This is to avoid unnecessary redundancy in the following description and to facilitate understanding by those skilled in the art.

A spectroscopic 3D image display device according to the embodiment of the present disclosure and projection type image display devices included in such a spectroscopic 3D image display device will be described with reference to FIGS. 1 to 7. The accompanying drawings and the following description are provided to enable those skilled in the art to fully understand the present disclosure, but and are not intended to limit the subject matter defined in the claims. In the drawings, the dimensions of each element are exaggerated for ease of explanation. The same reference numerals are used to denote substantially the same elements throughout the drawings.

<<Embodiment>>

<Configuration of Spectroscopic 3D Image Display Device>

Referring to FIG. 1, an overall configuration of the spectroscopic 3D image display device according to the embodiment of the present disclosure will be described below. FIG. 1 is a block diagram showing an example of the overall configuration of a spectroscopic 3D image display device 700 according to the embodiment of the present disclosure.

As shown in FIG. 1, the spectroscopic 3D image display device 700 of this embodiment includes a projection type image display device 600a, a projection type image display device 600b, and a system controller 100. The projection type image display devices 600a and 600b include, respectively, light source devices 200a and 200b, illumination optical systems 300a and 300b, light modulation elements 400a and 400b, and projection optical system 500a and 500b. The two projection type image display devices 600a and 600b have a similar configuration. However, the projection type image display device 600a differs from the projection type image display device 600b in the following respect. That is, the light source device 200a is configured with a laser light source that emits blue light LBa, whereas the light source device 200b is configured with a laser light source that emits blue light LBb having a wavelength different from that of the blue light LBa.

The system controller 100 includes a synchronous controller 110, a light source controller 120, an illumination optical system controller 130, and a light modulation element controller 140. The system controller 100 includes, for example, a CPU, a ROM, a RAM, and the like (not shown), and the CPU cooperates with the RAM to execute a program stored in the ROM, allowing the controllers to implement their respective control functions. The synchronous control part 110 sends a synchronization signal to the light source controller 120, the illumination optical system controller 130, and the light modulation element controller 140, driving the projection type image display devices 600a and 600b in synchronization. As a result, colored lights with different wavelengths are emitted synchronously and in a time-division manner so that images Va and Vb for both eyes can be displayed. For example, the synchronous controller 110 can cause the period in which the light source controller operates the light source devices 200a and 200b; the period in which the illumination optical system controller 130 rotates phosphor wheels of the illumination optical systems 300a and 300b; and the period in which the light modulation element controller 140 displaces the light modulation elements 400a and 400b to be synchronous.

In the spectroscopic 3D image display device 700 thus configured, the projection type image display devices 600a and 600b can project the image Va for the left eye of the viewer and the image Vb for the right eye of the viewer onto a same projection target 50 in a superimposed manner using illumination light including colored light of two or more color bands each having a different wavelength. When the viewer observes the images Va and Vb on the projection target 50 through 3D glasses (not shown), the images Va and Vb are perceived as a stereoscopic image due to the viewer's binocular disparity. The spectroscopic 3D image display device 700 shown in FIG. 1 is not limited to including two projection type image display devices 600a and 600b. For example, the spectroscopic 3D image display device 700 can be configured by two sets of projection type image display devices each including two or more projection type image display devices 600a and two or more projection type image display devices 600b, respectively.

<Configuration of Projection Type Image Display Device According to First Example>

Figure 2:
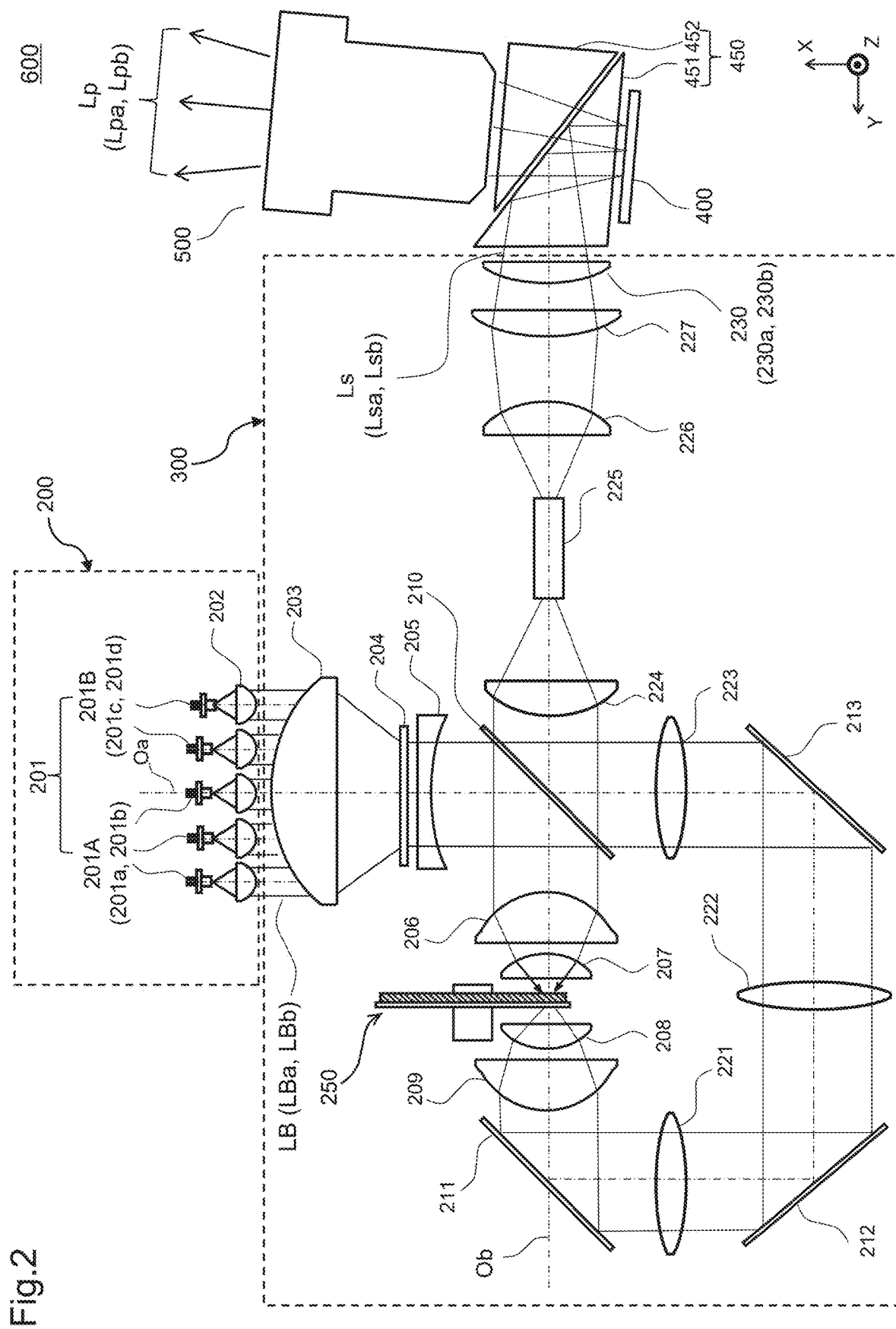
FIG. 2 is a schematic diagram showing an example of the configuration of a projection type image display device according to a first example of the embodiment and is a diagram exemplarily showing the configuration of the projection type image display device of the spectroscopic 3D image display device of FIG. 1.

The projection type image display devices 600a and 600b included in the spectroscopic 3D image display device 700 shown in FIG. 1 may have the same configuration. Referring to FIG. 2, an example of the configuration of the projection type image display devices 600a and 600b will be described below. FIG. 2 is a schematic diagram showing a configuration of a projection type image display device 600 according to a first example of the embodiment and is a diagram exemplarily showing the configuration of the projection type image display devices 600a and 600b of the spectroscopic 3D image display device 700 of FIG. 1. For clarity, in FIG. 2, each light beam is shown by only a main ray.

As shown in FIG. 2, the projection type image display device 600 according to the first example of the embodiment includes a light source device 200, an illumination optical system 300, a light modulation element 400, and a projection optical system 500. In the projection type image display device 600 shown in the figure, similar constituent elements as in the projection type image display devices 600a and 600b are denoted by the same reference numerals. Constituent elements having different characteristics between the projection type image display device 600a and the projection type image display device 600b are shown together with constituent elements corresponding to each of the projection type image display devices 600a and 600b. For example, laser elements 201A and 201B and a spectroscopic element 230 are designated with laser elements 201a, 201c and a spectroscopic element 230a corresponding to the projection type image display device 600a, which are shown together with laser elements 201b, 201d and a spectroscopic element 230b corresponding to the projection type image display device 600b.

<Light Source Device>

The light source device 200 is configured with a plurality of semiconductor lasers to implement high-luminance emitted light. In this embodiment, the light source device 200 uses a plurality of semiconductor laser elements 201 each emitting blue light. The semiconductor laser elements 201 and the condenser lens 203 can be arranged in a matrix at regular intervals on, for example, a heat sink (not shown). In the spectroscopic 3D image display device 700 according to this embodiment, the semiconductor laser element 201 used as a light source of the projection type image display device includes the laser element 201A and laser element 201B. The laser element 201A and laser element 201 B can be configured to include blue semiconductor laser elements emitting blue light having different central wavelengths.

In this embodiment, the light source device of the projection type image display device 600a includes the laser element 201a and the laser element 201c. The laser element 201a emits blue light having a central wavelength $\lambda a$ and the laser element 201c emits blue light having a central wavelength $\lambda c$. The blue light for displaying the image Va for left eye by the projection type image display device 600a has the main wavelength $\lambda a$ and is formed mainly from blue light of the laser element 201a. In order to excite the phosphor in the projection type image display device 600a to emit fluorescent light including colored light such as red light and green light, both blue light with the central wavelength $\lambda a$ from the laser element 201a and blue light with the central wavelength $\lambda c$ from the laser element 201c are used.

On the other hand, the light source device of the projection type image display device 600b includes the laser element 201b and the laser element 201d. The laser element 201b emits blue light having a central wavelength $\lambda b$. The laser element 201d emits blue light having a central wavelength $\lambda d$. The blue light for displaying the image Vb for right eye by the projection type image display device 600b has the main wavelength $\lambda b$ and is formed mainly from blue light of the laser element 201b. In order to excite the phosphor in the projection type image display device 600b to emit fluorescent light including colored light such as red light and green light, both blue light with the central wavelength $\lambda b$ from the laser element 201b and blue light with the central wavelength $\lambda d$ from the laser element 201d are used.

In this way, in the spectroscopic 3D image display device 700 according to the present disclosure, the light source devices of the two projection type image display devices are each configured to include two types of laser elements. In the following, for convenience of explanation, the laser element 201a emitting blue light with the central wavelength $\lambda a$ that forms blue light of the projection type image display device 600a and the laser element 201b emitting blue light with the central wavelength $\lambda b$ that forms blue light of the projection type image display device 600b will be referred to as "first light source". The laser element 201c emitting blue light with the central wavelength $\lambda c$ and the laser element 201d emitting blue light with the central wavelength $\lambda d$ will be referred to as "second light source". In this specification, blue light with the central wavelengths $\lambda a$, $\lambda b$, $\lambda c$, and $\lambda d$ will be referred also as "first blue light", "second blue light", "third blue light", and "fourth blue light,"

respectively. Note that such a designation is made only to facilitate understanding of the present disclosure and is not intended thereby to limit the present disclosure.

Thus, in this embodiment, the light source devices 200 of the projection type image display device 600*a* and 600*b* are configured to include the light source 201 including their respective first light sources 201*a* and 201*b* and second light sources 201*c* and 201*d*. The light source 201 of the projection type image display device 600*a* emits blue light LBa having the central wavelength λa and λc, while the light source 201 of the projection type image display device 600*b* emits blue light LBb having the central wavelengths λb and λd.

To create a 3D image, the spectroscopic 3D image display device 700 is not limited to but may be configured with that, for example, the central wavelength λa of the first light source 201*a* of the projection type image display device 600*a* is set to 465 nm, while the central wavelength λb of the first light source 201*b* of the projection type image display device 600*b* is set to 445 nm. The central wavelength λc of the second light source 201*c* of the projection type image display device 600*a* may be configured to satisfy λb≤λc<λa, while the central wavelength λd of the second light source 201*d* of the projection type image display device 600*b* may be configured to satisfy λb<λd≤λa. Here, the respective second light sources 201*c* and 201*d* of the projection type image display device 600*a* and 600*b* may be laser elements that emit blue light having the same central wavelength, or may be laser elements that emit blue light having a different central wavelength. In this embodiment, the second light sources 201*c* and 201*d* are configured from a laser element that emits blue light having the same central wavelength, with the central wavelengths λc and λd being both 455 nm.

Although in this embodiment, the projection type image display device 600*a* and 600*b* are each configured to have the first and second light sources, the present disclosure is not limited thereto. For example, the projection type image display device 600*a* may be configured to have the first and second light sources, whereas the projection type image display device 600*b* may be configured to only include the first light source. Furthermore, one or both of the projection type image display devices 600*a* and 600*b* may be configured to include a first light source and two or more second light sources.

Blue laser light LB emitted from the light source 201 is collimated by a collimating lens 202 and emitted as substantially parallel light from the light source device 200 in the −X direction in the figure, to enter the illumination optical system 300.

<Illumination Optical System>

The illumination optical system 300 includes lenses 203 and 205, a diffusion plate 204, a dichroic mirror 210, lenses 206, 207, 208, and 209, a phosphor wheel 250, mirrors 211, 212, and 213, lenses 221, 222, 223, and 224, a rod integrator 225, lenses 226 and 227, and a spectroscopic element 230. The illumination optical system 300 is configured to direct the light emitted from the light source device 200 to the light modulation element.

The blue laser light LB incident from the light source device 200 is focused by the lens 203, passes through the diffusion plate 204, and then is collimated again by the lens 205, travels along an optical axis Oa, and falls on the dichroic mirror 203 disposed at an inclination angle of approximately 45 degrees with respect to the optical axis Oa.

The dichroic mirror 210 has characteristics of reflecting blue laser light LB of the light source 201 but transmitting light in other wavelength bands. The blue laser light LB incident in the −X direction in the figure is reflected by the dichroic mirror 21, exits in the direction of +Y in the figure, travels along an optical axis Ob, then is focused by the lenses 206 and 207, and enters the phosphor wheel 250.

<Phosphor Wheel>

Figure 3A:
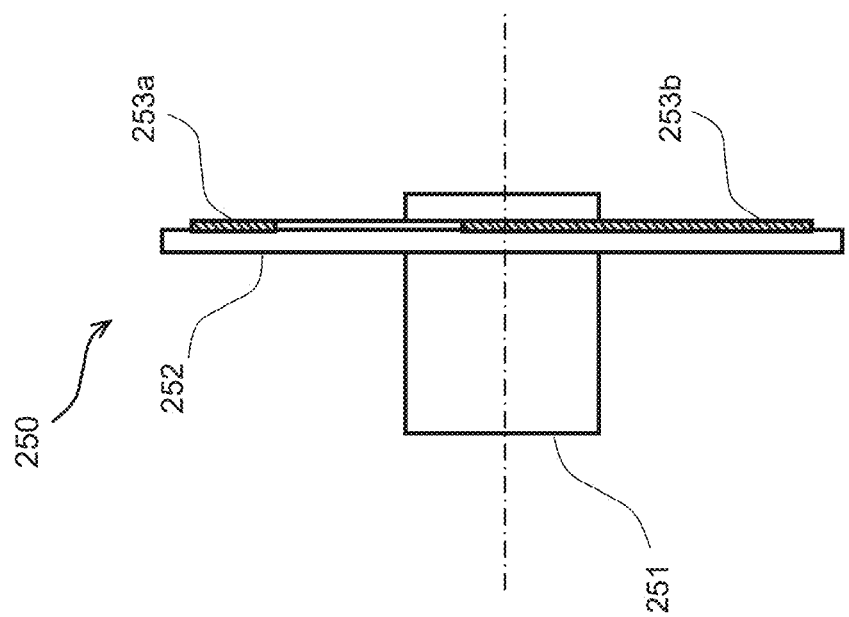
FIG. 3A is a diagram showing an example of the configuration of a phosphor wheel of the projection type image display device of FIG. 2.
Figure 3B:
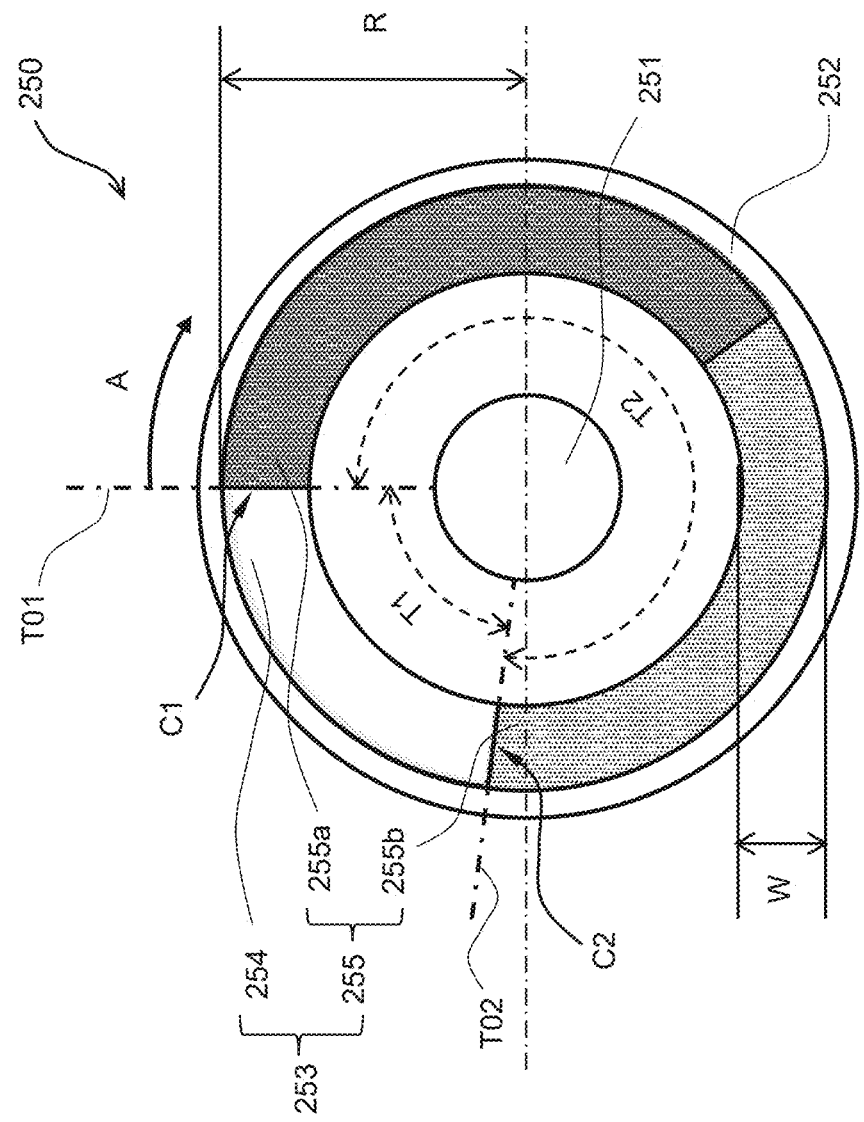
FIG. 3B is a diagram showing an example of the configuration of a phosphor wheel of the projection type image display device of FIG. 2.

Referring to FIG. 3A and FIG. 3B, a configuration of the phosphor wheel 250 will be described below. FIG. 3A and FIG. 3B are diagrams showing an example of the configuration of the phosphor wheel 250 of the projection type image display device 600 of FIG. 2. FIG. 3A shows a side surface of the phosphor wheel 250 in the XY plane of FIG. 2, and FIG. 3B shows a front surface of the phosphor wheel 250 facing the −Y direction in the XZ plane of FIG. 2. The phosphor wheel 250 is configured to allow blue light emitted from light source device 200 to pass through and to create fluorescent light excited by the light emitted from light source device 200, and the phosphor wheel 250 is configured to output the blue light and the fluorescent light in a time-division manner by rotation.

As shown in FIG. 3A, the phosphor wheel 250 is configured from a motor 251 at the center and a disk-shaped rotating substrate 252 rotationally driven by the motor 251.

On the surface of the rotating substrate 252 shown in FIG. 3B, an annular region 253 having an outer diameter R and a width W in the radial direction is formed along the circumferential direction. In this embodiment, the annular region 253 is configured to include an opening region 254 and a phosphor layer region 255. The opening region 254 allows the incident blue laser light LB to pass through. The phosphor layer region 255 has a phosphor layer formed therein that is excited by the incident blue laser light LB and creates fluorescent light. In this embodiment, the phosphor layer region 255 is configured to include a red phosphor portion 255*a* and a green phosphor portion 255*b* that are formed along the circumferential direction. The red phosphor portion 255*a* is excited by the incident blue laser light LB and creates red fluorescence. The green phosphor portion 255*b* is excited by the incident blue laser light LB and creates green fluorescence.

Although in FIG. 3B, the phosphor layer region 255 of the phosphor wheel 250 is shown to have two phosphor portions, the present disclosure is not limited thereto. For example, the phosphor layer region of the phosphor wheel 250 may be configured to have one phosphor portion or three or more phosphor portions.

The phosphor wheel 250 may be configured to rotate in the illustrated rotation direction A by the driving of the motor 251 that is controlled by the illumination optical system controller 130. As the phosphor wheel 250 rotates, the incident blue laser light LB is alternately incident on the opening region 254 and the phosphor layer region 255. For example, at a start time T01, the phosphor wheel 250 rotates in the direction A from a boundary position C1 between the opening region 254 and the red phosphor portion 255*a*. During a period T1, the phosphor wheel 250 rotates in the direction A and arrive at a boundary position C2 between the opening region 254 and the green phosphor portion 255*b*. During the period T1, the opening region 254 receives the light, allowing the blue light to pass through. Then the phosphor wheel 250 further rotates in the A direction. During a period T2, the phosphor wheel 250 rotates from the boundary position C2 to the boundary position C1. During the period T2, the phosphor layer region 255 receives light, and the green fluorescent light from the green phosphor portion 255*b* and the red fluorescent light from the red phosphor portion 255*a* are created and output in sequence. In this manner, during one rotation of the phosphor wheel 250, the blue light, the green fluorescent light, and the red fluorescent light are emitted in a time-division manner. In this embodiment, the system controller 100 can control the light source device 200 to operate periodically in synchronization with the rotation of the phosphor wheel 250. The light source device 200 is under the control of the system controller 100. The system controller 100 is configured to cause the first light source to emit light at a predetermined output power and to cause the second light source to emit light with switched intensities of the output power. The synchronous control between the action of the light source device 200 and the rotation of the phosphor wheel 250 by the system controller 100 will be described below with reference to FIG. 4.

<Synchronous Control between Action of Light Source Device and Rotation of Phosphor Wheel>

Figure 4:
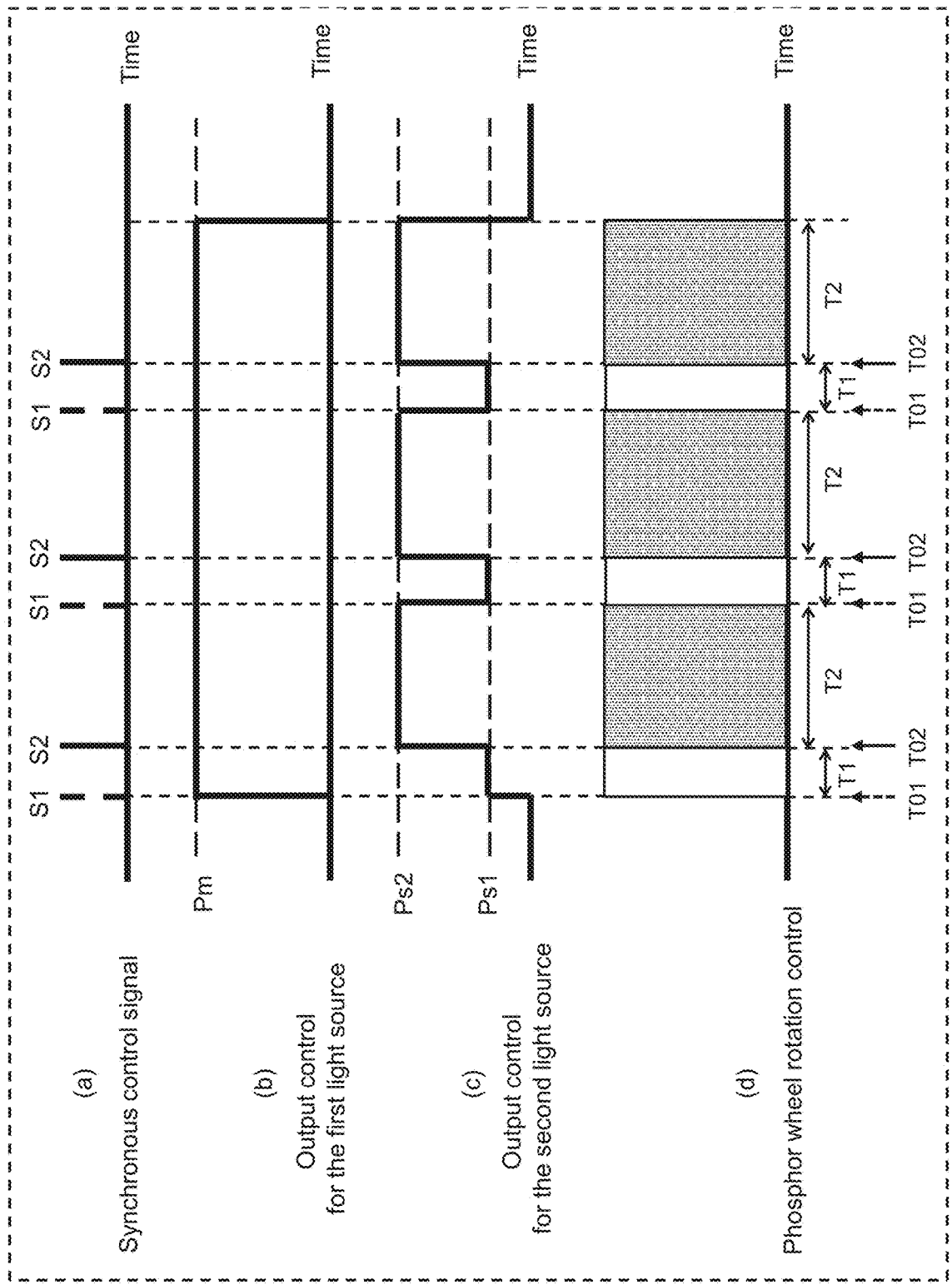
FIG. 4 is a diagram showing an example of synchronous control between the action of a light source device and the rotation of a phosphor wheel, of the projection type image display device, in the spectroscopic 3D image display device of FIG. 1.

FIG. 4 is a diagram showing an example of synchronous control between the action of the light source device 200 and the rotation of the phosphor wheel 250, of the projection type image display device 600, in the spectroscopic 3D image display device 700 of FIG. 1. FIG. 4 shows examples of behaviors of synchronous control signal (a) from the synchronous controller 110, output control for the first light source (b) and output control for the second light source (c) by the light source controller 120, and phosphor wheel rotation control (d) by the illumination optical system controller 130, of the system controller 100, in the spectroscopic 3D image display device 700 according to the embodiment of the present disclosure. In FIG. 4, the axis of abscissas indicates the period over three rotations of the phosphor wheel.

In this embodiment, the synchronous controller 110 of the system controller 100 sends, for example, synchronous control signals S1 and S2 to the light source controller 120 and the illumination optical system controller 130 so that synchronization can be achieved between the output control for the light source device 200 by the light source controller 120 and the rotation control for the phosphor wheel 250 by the illumination optical system controller 130. The synchronous control signals S1 and S2 can be triggered by, but is not limited thereto, detection information of light emitted from the phosphor wheel 250. For example, a light sensor (not shown) detects light emitted from the phosphor wheel 250 and sends light detection signal to the synchronous controller 110. In the rotation period of the phosphor wheel 250, at the start time T01 of the period T1 of rotation, the opening region 254 shown in FIG. 3B starts to receive light. At this time, the synchronous controller 110 can issue the sync signal S1 based on blue light detection information. At a start time T02 of the period T2, the phosphor layer region 255 shown in FIG. 3B starts to receive light. At this time, the synchronous controller 110 can issue the sync signal S2 based on green light detection information.

As shown in FIG. 4, at the start time T01 of the period T1 of rotation, the synchronous controller 110 sends a synchronous control signal S1 to the light source controller 120. When receiving the synchronous control signal S1, the light source controller 120 causes the first light sources 201a and 201b of the light source device 200 of the projection type image display device 600 to emit blue light having the central wavelengths λa and λb with an output power Pm, and causes the second light sources 201c and 201d to emit blue light having the central wavelengths λc and λd with a low output power Ps1. At this time, the low output power Ps1 of the blue light from the second light source is lower than the output power Pm of the blue light from the first light source.

Succeedingly, over the period T1 during which the opening region 254 receives light, the opening region 254 of the phosphor wheel 250 receives light, allowing blue light to pass through. At this time, the blue light having the central wavelengths λa and λb from the first light source is emitted at the output power Pm, whereas the blue light having the central wavelengths λc and λd from the second light source is emitted with low output power Ps1. This enables formation of the blue lights having the main wavelengths λa and λb, respectively, which are used for displaying the images Va and Vb generated by the projection type image display devices 600a and 600b. In this embodiment, emitted blue light having a central wavelength λa of 465 nm may be used for displaying the image Va and blue light having a central wavelength λb of 445 nm may be used for displaying the image Vb.

Next, at the start time T02 of the period T2, the synchronous controller 110 sends a synchronous control signal S2 to the light source controller 120. When receiving the synchronous control signal S2, the light source controller 120 causes the first light sources 201a and 201b of the light source device 200 of the projection type image display device 600 to emit blue light having the central wavelengths λa and λb at the output power Pm, and causes the second light sources 201c and 201d to emit blue light having the central wavelengths λc and λd with a high output power Ps2. The high output power Ps2 of the second light sources 201c and 201d is an output power higher than the low output power Ps1.

Subsequently, during the period T2 when the phosphor layer region 255 receives light, the phosphor layer region 255 of the phosphor wheel 250 receives light, fluorescent light created is output. At this time, the blue light with the central wavelengths λa and λb from the first light source and the blue light with the central wavelengths λc and λd from the second light source impinge incident on the phosphor layer with the output powers Pm and Ps2, respectively, by which the phosphor layer is excited and fluorescent light is created.

Thus, in this embodiment, as the phosphor wheel 250 rotates, the synchronous controller 110 repeatedly sends the synchronous control signals S1 and S2 to the light source controller 120, to synchronize the action of the light source devices of the projection type image display devices 600a and 600b with the rotation of the phosphor wheel 250. When receiving the synchronous control signals S1 and S2 from the synchronous controller 110, the light source controller 120 causes the light source device 200 to periodically perform in synchronization with the rotation of the phosphor wheel 250. Under the control of the light source controller 120, the first light source can emit light at the output power Pm while the second light source can emit light with periodically switched intensities of the output power varying between the low output power Ps1 and the high output power Ps2, depending on the light reception region of the phosphor wheel 250.

The low output power Ps1 of the second light source may be 50% or less of the output power Pm of the first light source. The value of the high output power Ps2 is not limited to the present disclosure. For example, the high output power Ps2 may be substantially the same as the output power Pm of the first light source, and in this embodiment, when the second light source emits light at the high output power Ps2, the percentage of the output power of the first light source to that of the second light source can be set to approximately 55% to 45%. This allows the phosphor layer of the phosphor wheel 250 to be efficiently excited by the combined light emitted by the first light source and the second light source.

Figure 9:
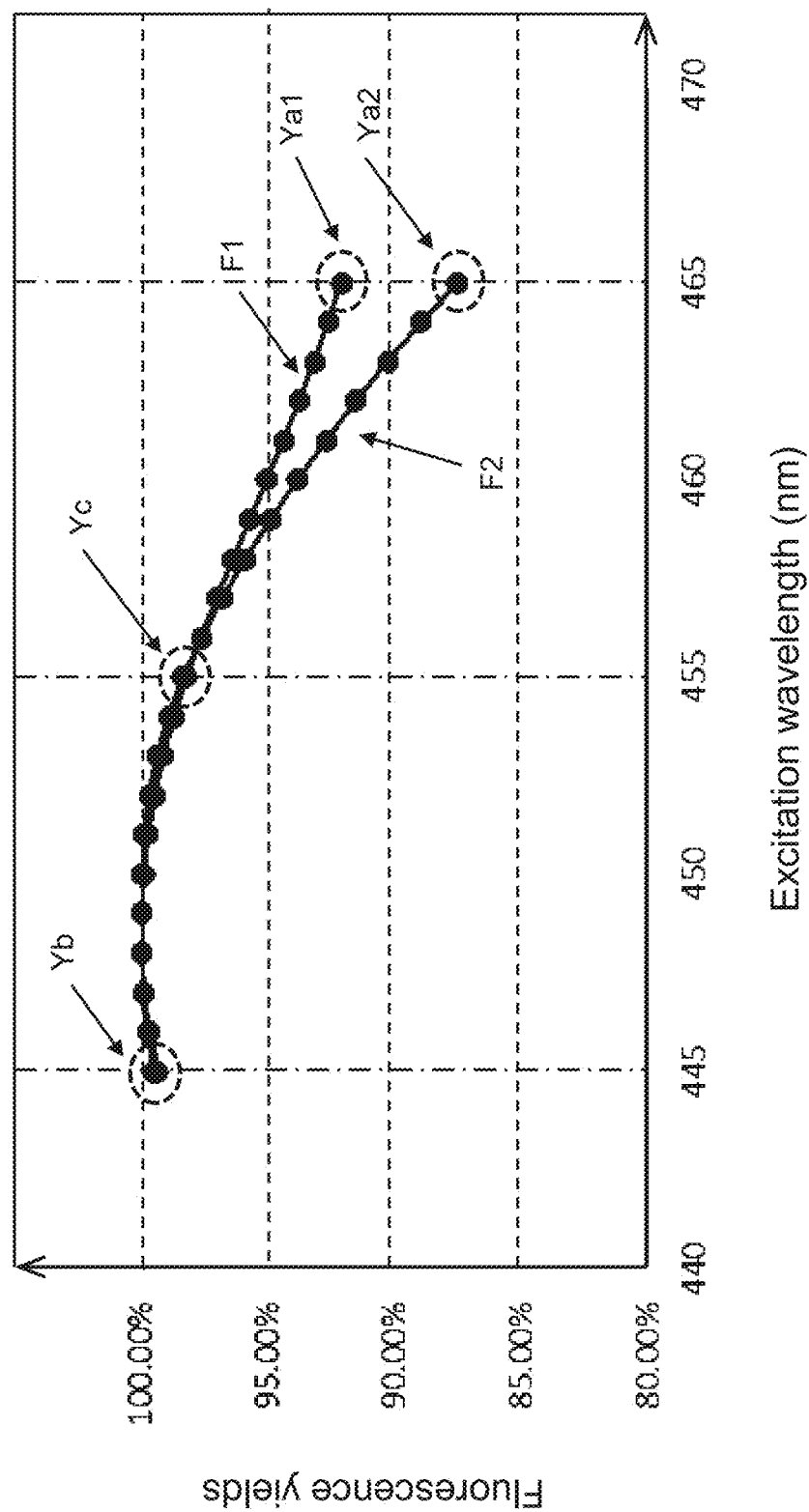
FIG. 9 is a graph showing an example of change in fluorescence yield caused by an excitation wavelength of a phosphor used in the projection type image display device.

In this embodiment, the blue light having the central wavelengths λc and λd from the second light source may be blue light having a central wavelength of 455 nm. As shown in FIG. 9, a phosphor F1 or a phosphor F2 has a fluorescence yield Yc of approximately 98% at an excitation wavelength of or near 455 nm. As a result, in the projection type image display device 600b, the light source device configured by combining the first light source with a wavelength of 445 nm and the second light source with a wavelength of 455 nm tends to have a slightly lower fluorescence yield compared to the fluorescence yield obtained when the light source device is configured by using only the first light source with a wavelength of 445 at a similar output power. On the other hand, in the projection type image display device 600a, the light source device configured by combining the first light source with a wavelength of 465 nm and the second light source with a wavelength of 455 nm can achieve a significantly increased fluorescence yield compared to the fluorescence yield obtained when the light source device is configured by using only the first light source with a wavelength of 465 at a similar output power (FIG. 9). Therefore, when the two projection type image display devices 600a and 600b have the light source devices configured with only the first light sources of 465 nm and 445 nm, respectively, the difference in the fluorescence yield between the phosphors caused by the difference in the wavelength of the light emitted from the light source devices is reduced by configuring the light source device using both the first light source and the second light source. This makes it possible to improve the luminance uniformity of the light forming images for both eyes in the spectroscopic 3D image display device 700.

In switching the intensity of output power of the second light source by the light source controller 120, during the period T1 when the blue light is emitted, the second light source can be powered off to set the output power to zero, and during the periodT2 when the fluorescent light is emitted, the second light source can be powered on. This allows the blue light to be formed only by the blue light from the first light source, and the phosphor to be efficiently excited by using combined light emitted from the first light source and the second light source. Thus, the luminance uniformity of the light forming images for both eyes is improved.

That is, the control of the light source controller 120 to switch the intensity of the output power of the second light source includes causing the second light source to emit light between an "off" mode in which the output power is zero, i.e., an output power "OFF" state, and an "on" mode, i.e., an output power "ON" state.

In FIG. 4, the output power Pm of the first light source is shown not to vary over the rotation period of the phosphor wheel 250, but the present disclosure is not limited thereto. The output power Pm of the first light source may vary depending on the intended uses. In the present disclosure, the rotation frequency of the phosphor wheel is not limited. For example, in this embodiment, the rotation frequency of the phosphor wheel 250 may be 120 Hz.

Referring back to FIG. 2, the propagation of light output in a time-division manner from the phosphor wheel 250 will be described below. A part of the red fluorescent light and the green fluorescent light obtained in the phosphor layer region 255 of the phosphor wheel 250 is output in the −Y direction from the phosphor wheel 250, and the other part is output in the +Y direction and then reflected by the rotating substrate 252 to be emitted in the −Y direction. These red fluorescent light and green fluorescent light are collimated by the lenses 207 and 206, pass through the dichroic mirror 210, and are converged by the condensing lens 224, enter the rod integrator 225.

On the other hand, blue light passing through the opening region 254 of the phosphor wheel 250 travels along a path that includes, in the mentioned order, the lenses 208 and 209, the mirror 211, the lens 221, the mirror 212, the lens 222, the mirror 213, and the lens 223. The blue light is reflected by the dichroic mirror 210 and converged by the condensing lens 224, enters the rod integrator 225. Here, the lenses 221, 222, and 223 function as a relay lens.

In this way, the blue light, green fluorescent light, and red fluorescent light output in a time-division manner from the phosphor wheel 250 enter the rod integrator 225 and are uniformed therein. The light output from the rod integrator 225 passes through the lenses 226 and 227 and enters the spectroscopic element 230. The configuration of the spectroscopic element 230 will be described below with reference to FIG. 5.

<Spectroscopic Element>

Figure 5:
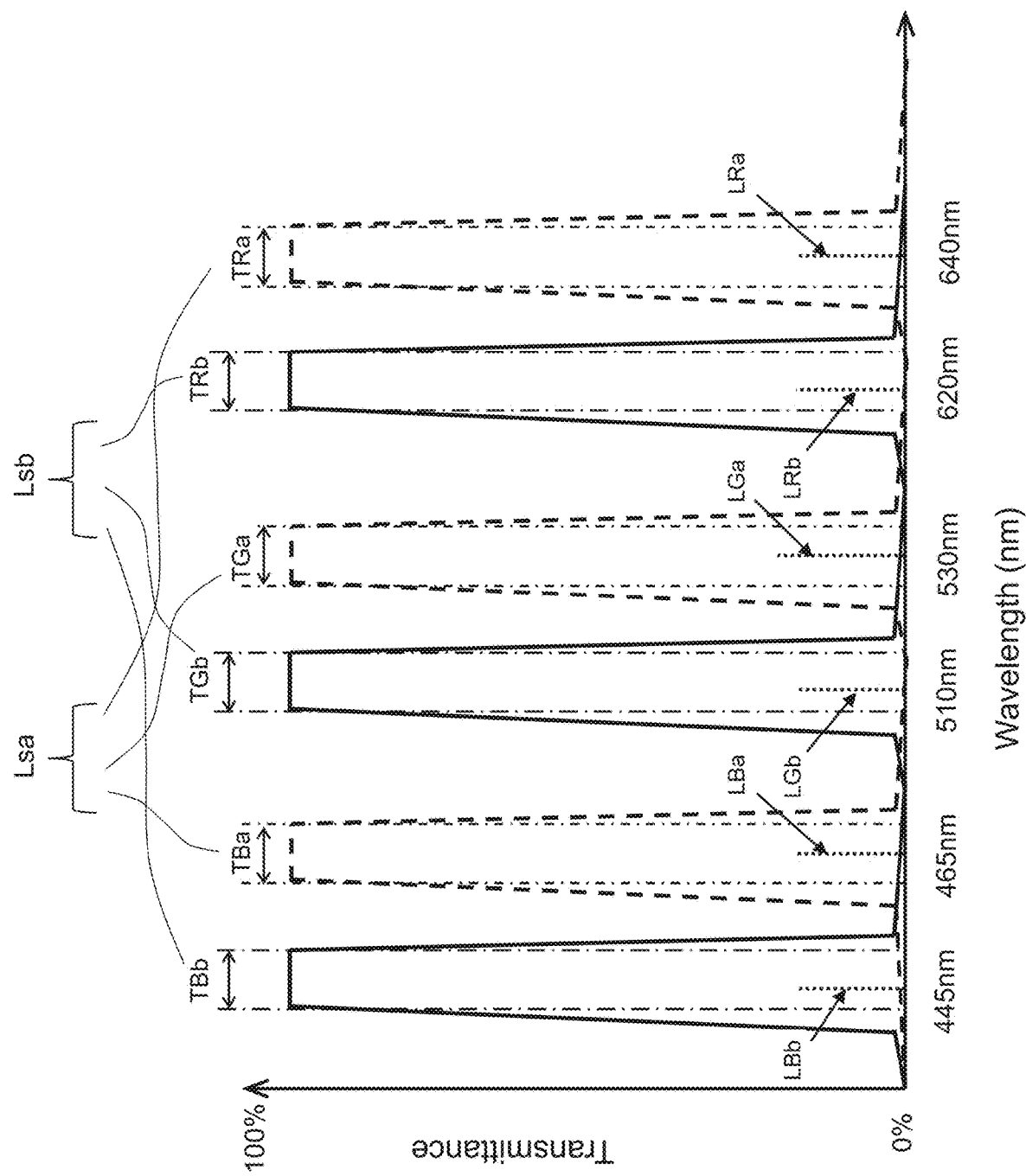
FIG. 5 is a graph showing spectral characteristics of a spectroscopic element of the projection type image display device of FIG. 2.

FIG. 5 is a graph showing the spectral characteristics of the spectroscopic element 230 of the projection type image display device 600 of FIG. 2. In this embodiment, the spectroscopic element 230 can be configured by applying a wavelength separation coating onto a lens. In FIG. 5, the transmission characteristics of the wavelength separation coating of the spectroscopic element 230a of the projection type image display device 600a are indicated by a broken line, and the transmission characteristics of the wavelength separation coating of the spectroscopic element 230b of the projection type image display device 600b are indicated by a solid line.

In the spectroscopic 3D image display device 700, the projection type image display devices 600a and 600b display the images Va and Vb using illumination light Lsa, Lsb including colored light of a plurality of bands each having a different wavelength in each color band. With the spectral characteristics shown in FIG. 5, the spectroscopic elements 230a and 230b are configured to allow colored light of the illumination light Lsa, Lsb of the projection type image display devices 600a and 600b to pass though and be output from the illumination optical system 300 (FIG. 2).

As shown in FIG. 5, the wavelength separation coating of the spectroscopic element 230a of the projection type image display device 600a has transmission regions TBa, TGa, and TRa having a transmittance of 90% or more at or near the wavelength of each colored light LBa, LGa, LRa of the illumination light Lsa of the projection type image display device 600a. The wavelength separation coating of the spectroscopic element 230a of the projection type image display device 600a has a reflectance of 95% or more at or near the wavelength of each colored light LBb, LGb, LRb of the illumination light Lsb of the projection type image display device 600b. As a result, each colored light of the illumination light Lsa of the projection type image display device 600a passes through the spectroscopic element 230a and is output from the illumination optical system 300. Each colored light of the illumination light Lsb of the projection type image display device 600b is reflected by the spectroscopic element 230a.

On the other hand, the wavelength separation coating of the spectroscopic element 230b of the projection type image display device 600b has transmission regions TBb, TGb, and TRb having a transmittance of 90% or more at or near the wavelength of each colored light LBb, LGb, LRb of the illumination light Lsb of the projection type image display device 600*b*. The wavelength separation coating of the spectroscopic element 230*b* of the projection type image display device 600*b* has a reflectance of 95% or more at or near the wavelength of colored light LBa, LGa, LRa of the illumination light Lsa of the projection type image display device 600*a*. As a result, each colored light of the illumination light Lsb of the projection type image display device 600*b* passes through the spectroscopic element 230*b* and is output from the illumination optical system 300. Each colored light of the illumination light Lsa of the projection type image display device 600*a* is reflected by the spectroscopic element 230*b*.

In this way, due to the different spectral characteristics of the spectroscopic elements 230*a* and 230*b* shown in FIG. 5, in each of the projection type image display devices 600*a* and 600*b*, the illumination light Lsa, Lsb including colored light of two or more color bands each having a different wavelength is output from the illumination optical system 300 and directed to the light modulation element. Although FIG. 5 shows the spectral characteristics of the spectroscopic elements 230*a* and 230*b* that transmit colored light of three primary colors, the present disclosure is not limited thereto. For example, the spectroscopic element may be configured to include a wavelength separation coating that transmits colored light of far more color bands.

<Image Display>

Referring back to FIG. 2, the propagation of the illumination light Ls output from the illumination optical system 300 will be described below. The projection type image display device 600 is an example of a single-panel projection type image display device that uses one DMD as a light modulation element. As shown in FIG. 2, in this embodiment, each colored light of the illumination light Ls passes through the emission spectroscopic element 230 in a time-division manner and is output from the illumination optical system 300. Each emitted colored light is incident on a total internal reflection (TIR) prism 450 consisting of a pair of prisms including a first prism 451 and a second prism 452, and is introduced into a digital micromirror device (DMD), which is the light modulation element 400. The lens constituting the spectroscopic element 230 has a function of imaging light from the exit surface of the rod integrator 225 on the DMD 400.

The light modulation element (DMD) 400 spatially modulates colored light of two or more color bands that is incident in accordance with an image signal, and can generate projection light according to the image signal. The image signals may include, for example, video signals. Specifically, the light modulation element 400 is controlled by the light modulation element controller 140 to deflect the micromirror in accordance with the image signal, and separates the incident light into reflected light that heads for the projection optical system 500 and reflected light that travels toward an area outside the effective area of the projection optical system 500. Projection light Lp reflected by the light modulation element 400 passes through the TIR prism 450 again and enters the projection optical system 500. The projection optical system 500 displays an image, for example, by magnifying and projecting the projection light Lp onto a projection target such as a screen.

The projection type image display devices 600*a* and 600*b* of the spectroscopic 3D image display device 700 use the illumination light Lsa and the illumination light Lsb, respectively, including colored light having a different wavelength in each color band, to form projection light Lpa and projection light Lpb. Projection light Lpa and Lpb are projected onto a projection target and form superimposed image Va and image Vb. Viewers watch the image Va and image Vb through 3D glasses, which include a left eye lens configured to block the right eye image, and a right eye lens configured to block the left eye image. Thus, viewers can perceive the images Va and Vb on the same projection target as a stereoscopic image due to binocular parallax.

In this manner, the spectroscopic 3D image display device 700 of the present disclosure includes projection type image display devices including the first light source and the second light source. Under control of the system controller, the second light source is operated to emit light with switched intensities of the output power. With such a configuration, the luminance uniformity of the light forming images for both eyes is improved.

<Configuration of Projection Type Image Display Device According to Second Example>

Figure 6:
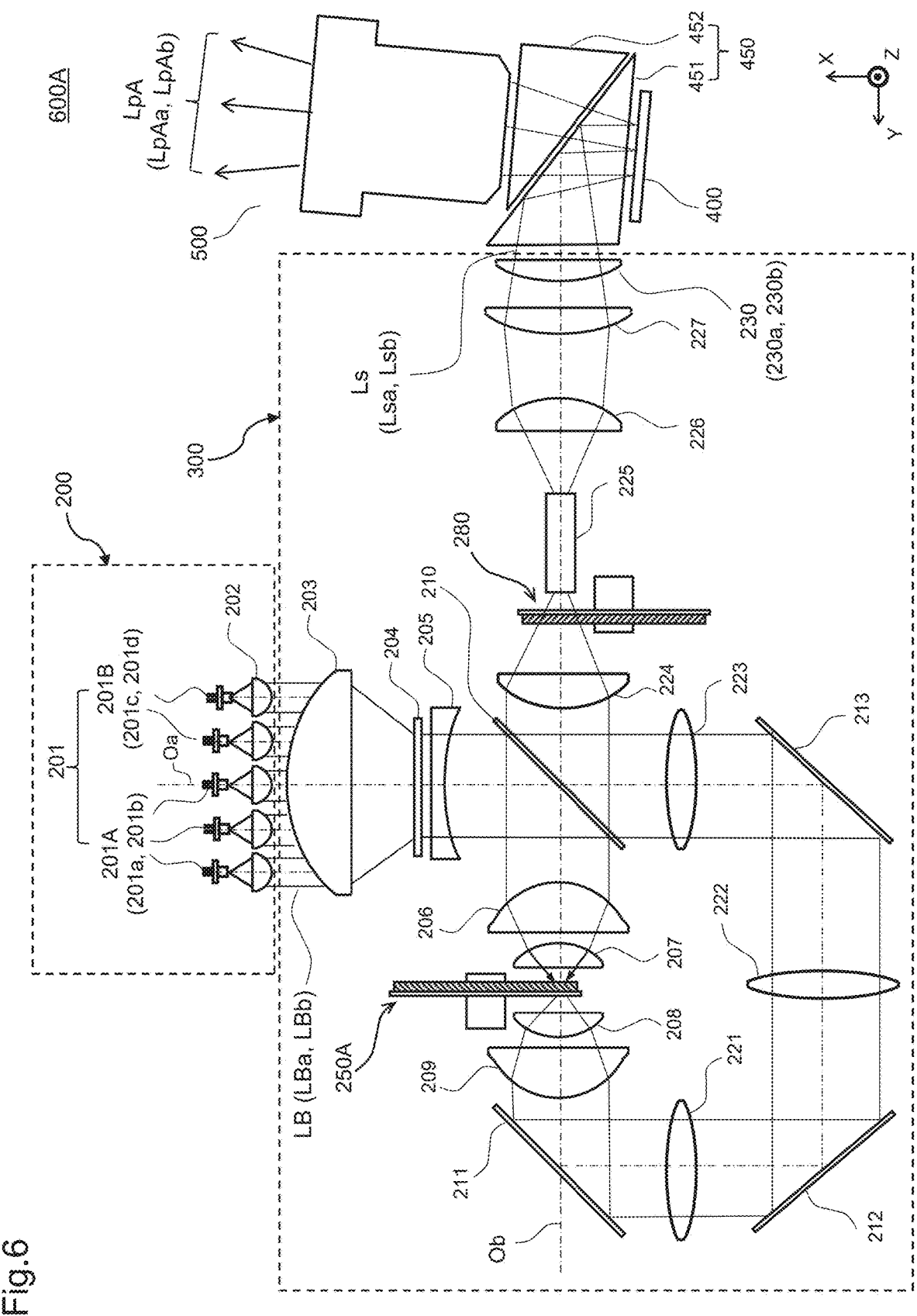
FIG. 6 is a schematic diagram showing an example of the configuration of a projection type image display device according to a second example of the embodiment, and is a diagram exemplarily showing the configuration of the projection type image display device of the spectroscopic 3D image display device of FIG. 1.

Referring then to FIG. 6, another example of the configuration of the projection type image display devices 600*a* and 600*b* included in the spectroscopic 3D image display device 700 shown in FIG. 1 will be described below. FIG. 6 is a schematic diagram showing the configuration of a projection type image display device 600A according to a second example of the embodiment, and is a diagram exemplarily showing the configuration of the projection type image display devices 600*a* and 600*b* of the spectroscopic 3D image display device 700 of FIG. 1.

The projection type image display device 600A according to the second example shown in FIG. 6 differs from the projection type image display device 600 according to the first example shown in FIG. 2 in that it further includes a color wheel 280. In FIG. 6, the same elements as those in the projection type image display device 600 of FIG. 2 are given the same reference numerals and will not be described. As shown in FIG. 6, the color wheel 280 is disposed at a position where a light beam of light emitted from a phosphor wheel 250A is converged by the condensing lens 224. The configuration of the color wheel 280 will be described below with reference to FIG. 7A and FIG. 7B.

<Color Wheel>

Figure 7A:
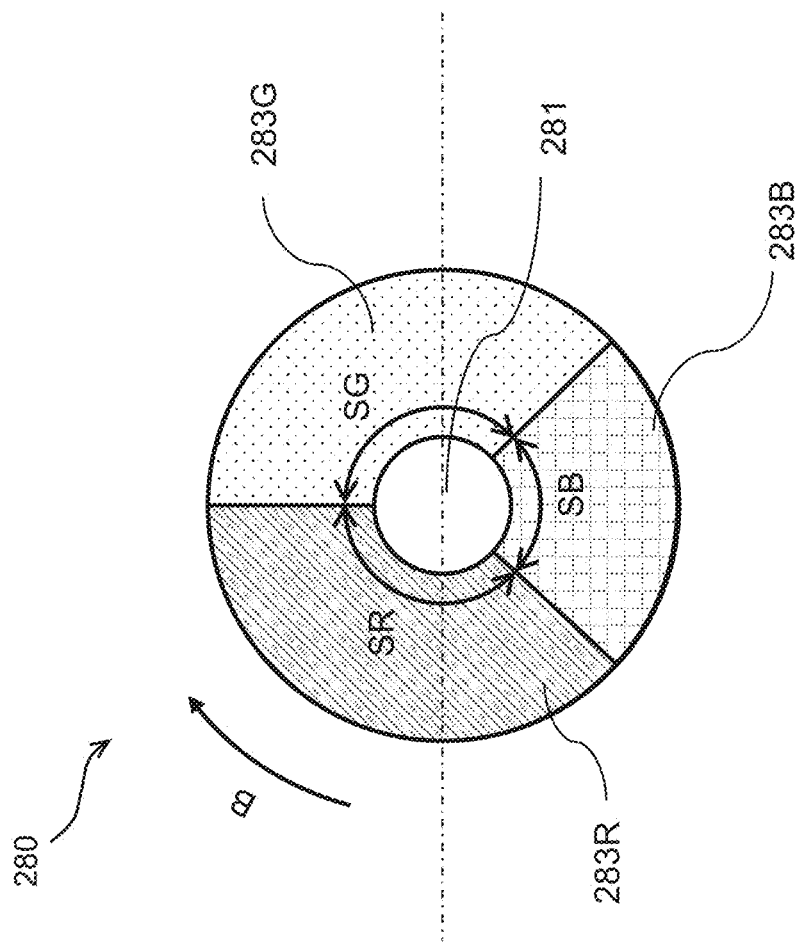
FIG. 7A is a diagram showing an example of the configuration of a color wheel of the projection type image display device of FIG. 6.
Figure 7B:
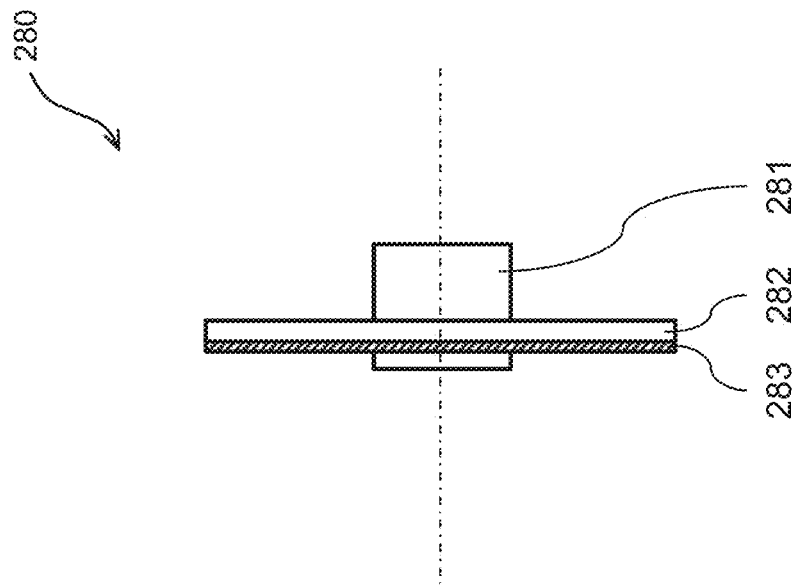
FIG. 7B is a diagram showing an example of the configuration of a color wheel of the projection type image display device of FIG. 6.
Figure 8:
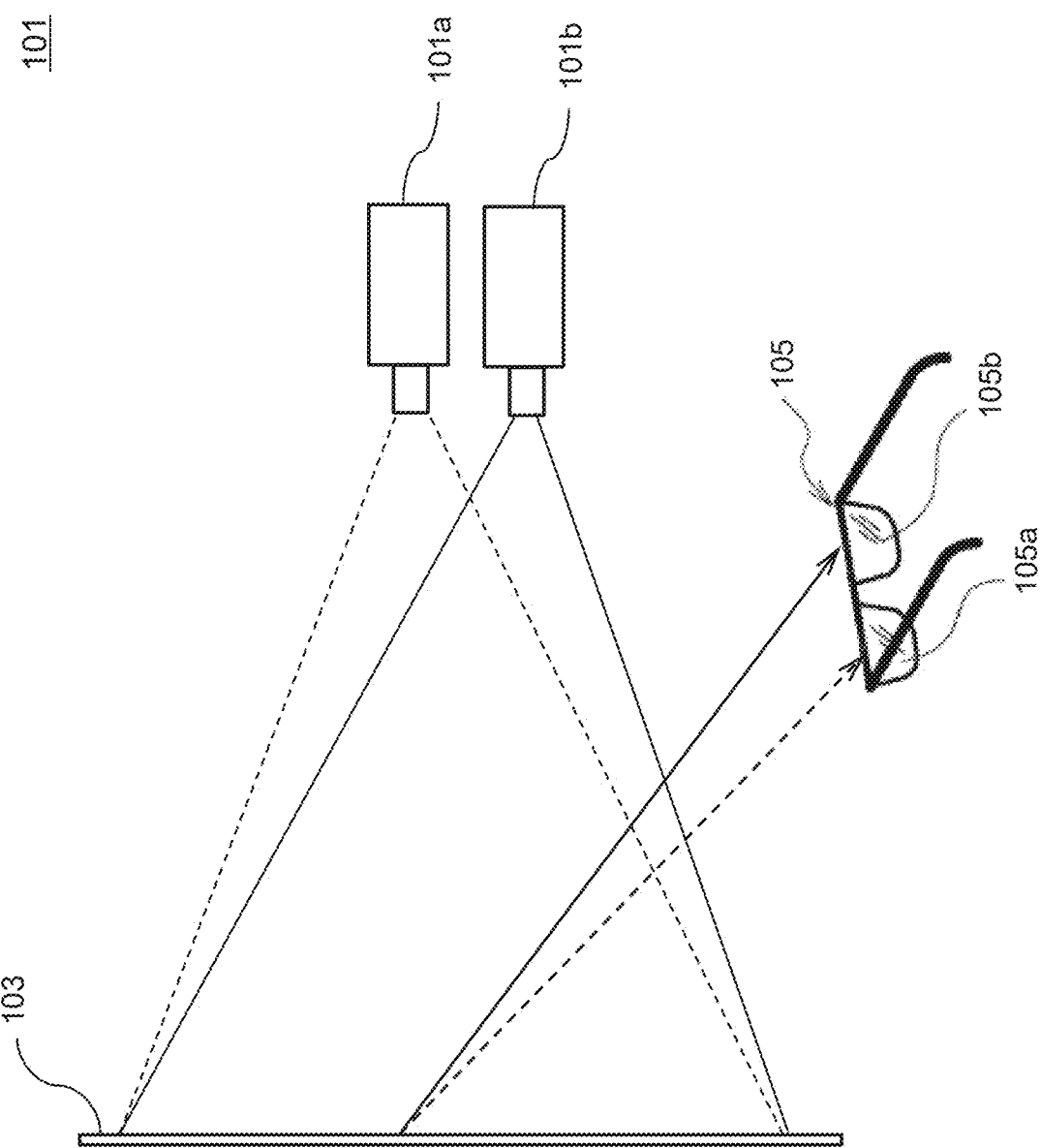
FIG. 8 is a conceptual plan view showing the configuration of a spectroscopic 3D image display device.

FIG. 7A and FIG. 7B are diagrams showing an example of the configuration of the color wheel 280 of the projection type image display device 600A of FIG. 6. FIG. 7A shows a front surface of the color wheel 280 facing the +Y direction in the XZ plane of FIG. 6. FIG. 7B shows a side surface of the color wheel 280 in the XY plane of FIG. 6. The color wheel 280 is configured to receive the light output from the phosphor wheel 250A, allow light of two or more color bands to pass through and be output in a time-division manner by rotation.

In this example, the phosphor wheel 250A has the opening region 254 and the phosphor layer region 255, similar to the phosphor wheel 250 shown in FIG. 3A and FIG. 3B. In the phosphor layer region 255 of the phosphor wheel 250A, a Ce-activated YAG yellow phosphor is formed that is excited by blue laser light and creates yellow fluorescence containing green and red components. A typical chemical structure of a crystal matrix of the phosphor is $Y_3Al_5O_{12}$. The yellow fluorescent light from the phosphor of the phosphor wheel 250A excited by the blue laser light has a central wavelength of 550 nm and a wider wavelength range of approximately 500 nm to 700 nm and contains two or more colored light components such as green and red. The yellow fluorescent light obtained in the phosphor layer region of the phosphor wheel 250A is collimated by the lenses 207 and 206, passes through the dichroic mirror 210, and is converged by the condensing lens 224, to enter the color wheel 280.

As shown in FIG. 7B, the color wheel 280 includes a transparent substrate 282, a dichroic layer 283 formed on the transparent substrate 282, and a motor 281 for rotating the transparent substrate 282.

The transparent substrate 282 has three colored light segments SR, SG, and SB in the circumferential direction. In this embodiment, the colored light segment SB of the color wheel 280 corresponds to the opening region 254 (see FIG. 3B) of the phosphor wheel 250A. The colored light segments SR and SG are adjacent to each other and correspond together to the phosphor layer region 255 (see FIG. 3B) of the phosphor wheel 250A.

The dichroic layer 283 includes a dichroic layer 283R that transmits red light created in the colored light segment SR, a dichroic layer 283G that transmits green light created in the colored light segment SG, and a dichroic layer 283B that transmits blue light created d in the colored light segment SB.

The color wheel 280 is controlled by the illumination optical system control unit 130 to rotate synchronously with the phosphor wheel 250A along a rotation direction B. Hence, yellow fluorescent light and blue light emitted from the phosphor wheel 250A are incident on the colored light segments SG, S R, and SB of the color wheel 280 in sequence.

When the yellow fluorescent light is incident on the colored light segment SG of the color wheel 280, only the green light component of the yellow fluorescent light passes through the dichroic layer 283G and is output from the color wheel 280 as green light. When the yellow fluorescent light is incident on the colored light segment SR of the color wheel 280, only the red light component of the yellow fluorescent light passes through the dichroic layer 283R and is output from the color wheel 280 as red light.

The blue light transmitted through the opening region 254 of the phosphor wheel 250A is incident on the colored light segment SB of the color wheel 280 and transmitted through the dichroic layer 283B, being output from the color wheel 280 as blue light.

Thus, due to the rotation of the color wheel 280, the light output from the phosphor wheel 250A is sequentially incident on each colored light segment, and colored light of two or more color bands transmitted through the dichroic layer of each colored light segments is output from the color wheel in a time-division manner. It should be noted that, although the color wheel 280 shown in FIG. 7A is depicted to have colored light segments of three primary colors, the present disclosure is not limited thereto. For example, the color wheel may be configured to have colored light segments of colored light of other color bands such as, e.g., cyan, magenta, and yellow, in addition to the three primary colors. By having a plurality of colored light segments, the color reproducibility of the projection type image display device can be improved, and an image with excellent color reproducibility can be implemented.

Other configurations of the projection type image display device 600A according to the second example are similar to those of the projection type image display device 600 according to the first example, thus detailed description will be omitted. The spectroscopic 3D image display device 700 including the projection type image display devices 600a and 600b having the configuration of the projection type image display device 600A according to the second example can improve the luminance uniformity of the light forming images for both eyes.

In the above embodiment, description has been made using the digital micromirror device (DMD) as the light modulation element, but the present disclosure is not limited thereto. For example, the projection type display device may be configured using a liquid crystal panel.

As above, the above embodiment has been set forth as an exemplification of the technology disclosed in this application. The accompanying drawings and detailed description have been provided for the understanding of the technology according to the present disclosure. Accordingly, the constituent elements described in the accompanying drawings and the detailed description may encompass not only constituent elements essential for solving the problems but also constituent elements not essential for solving the problems, for the purpose of exemplifying the above technology. Hence, those not-essential constituent elements should not be construed as essential directly from the fact that they are described in the accompanying drawings and the detailed description.

Although the present disclosure has been fully described in connection with the preferred embodiment with reference to the accompanying drawings, various modifications are possible within the scope of the claims. Such modifications and embodiments obtained by properly combining the technical means disclosed in the different embodiments are also encompassed within the technical scope of the present disclosure.

The present disclosure is applicable to a 3D image display device and is applicable to a projection type image display device such as a projector.

What is claimed is:

1. A spectroscopic 3D image display device, comprising:
   at least one first projection type image display device that projects a first image onto a projection target by using first illumination light including colored light of two or more color bands;
   at least one second projection type image display device that projects a second image onto the projection target by using second illumination light including colored light of two or more color bands each having a wavelength different from wavelengths of the first illumination light, the second projection type image display device projecting the second image superimposed on the first image; and
   a system controller configured to control the first projection type image display device and the second projection type image display device,
   wherein
   each of the first projection type image display device and the second projection type image display device comprises:
   a light source device that emits blue light;
   a light modulation element that spatially modulates incident colored light of two or more color bands in accordance with an image signal, to generate projection light corresponding to the image signal;
   an illumination optical system that allows blue light emitted from the light source device to pass through and creates fluorescent light excited by the light emitted from the light source device, the illumination optical system outputting and directing the blue light and the fluorescent light to the light modulation element in a time-division manner; and
   a projection optical system that magnifies and projects the projection light from the light modulation element onto the projection object, to display an image thereon,
   wherein the light source device of the first projection type image display device is configured to emit a first blue light having a central wavelength $\lambda a$ and at least one third blue light having a central wavelength $\lambda c$, the light source device of the second projection type image display device is configured to emit a second blue light having a central wavelength $\lambda b$, the central wavelengths $\lambda a$, $\lambda b$, and $\lambda c$ satisfying $\lambda b \leq \lambda c < \lambda a$, and the system controller is configured to cause the light source devices to emit both the first blue light and the second blue light at a predetermined output power, and to cause the light source devices to emit the third blue light at a first output power that is lower than the output power of the first blue light and the second blue light when the illumination optical system outputs the blue light, and to cause the light source devices to emit the third blue light at a second output power that is higher than the first output power when the illumination optical system outputs the fluorescent light.

2. The spectroscopic 3D image display device according to claim 1, wherein the light source device of the second projection type image display device is configured to emit the second blue light having the central wavelength $\lambda b$ and a fourth blue light having at least one central wavelength $\lambda d$, the central wavelengths $\lambda a$, $\lambda b$ and $\lambda d$ satisfying $\lambda b < \lambda d \leq \lambda a$, and the system controller is configured to cause the light source devices to emit the fourth blue light at a third output power that is lower than the output power of the first blue light and the second blue light when the illumination optical system outputs the blue light, and to cause the light source devices to emit the fourth blue light at a fourth output power that is higher than the third output power when the illumination optical system outputs the fluorescent light.

3. The spectroscopic 3D image display device according to claim 1, wherein the first output power of the third blue light is less than or equal to 50% of the output power of the first blue light and the second blue light.

4. The spectroscopic 3D image display device according to claim 1, wherein the light source device of the first projection type image display device is configured to power off the third blue light when the third blue light is emitted at the first output power, and to power on the third blue light when the third blue light is emitted at the second output power.

5. The spectroscopic 3D image display device according to claim 2, wherein the third output power of the fourth blue light is less than or equal to 50% of the output power of the first blue light and the second blue light.

6. The spectroscopic 3D image display device according to claim 2, wherein the light source device of the second projection type image display device is configured to power off the fourth blue light when the fourth blue light is emitted at the third output power, and to power on the fourth blue light when the fourth blue light is emitted at the fourth output power.

7. The spectroscopic 3D image display device according to claim 1, wherein the illumination optical system comprises a phosphor wheel, the phosphor wheel includes a first region and a second region that are arranged along a rotation direction, the first region allowing blue light emitted from the light source device to pass through, the second region having a phosphor layer creating the fluorescent light excited by blue light emitted from the light source device, light emitted from the light source device alternately enters the first region and the second region with rotation of the phosphor wheel, and the system controller is configured to cause the light source device to periodically operate in synchronization with the rotation of the phosphor wheel.

8. The spectroscopic 3D image display device according to claim 1, wherein the illumination optical system comprises a spectroscopic element configured to receive light and allow colored light of two or more color bands to pass through in a time-division manner, the spectroscopic element of the first projection type image display device allows colored light of the first illumination light to pass through and reflects colored light of the second illumination light, and the spectroscopic element of the second projection type image display device allows colored light of the second illumination light to pass through and reflects colored light of the first illumination light.

9. The spectroscopic 3D image display device according to claim 8, wherein the spectroscopic elements have wavelength separation coating applied thereto, the wavelength separation coating of the spectroscopic element of the first projection type image display device has a transmittance of 90% or more at or near a wavelength of colored light of each color band of the first illumination light and has a reflectance of 95% or more at or near a wavelength of colored light of each color band of the second illumination light, and the wavelength separation coating of the spectroscopic element of the second projection type image display device has a transmittance of 90% or more at or near a wavelength of colored light of each color band of the second illumination light and has a reflectance of 95% or more at or near a wavelength of colored light of each color band of the first illumination light.

10. The spectroscopic 3D image display device according to claim 1, wherein the illumination optical system further comprises a color wheel that receives the blue light and the fluorescent light, the color wheel includes two or more colored light segments arranged along a direction of rotation, each of the colored light segments having a dichroic layer that allows colored light of a predetermined color band of incident light to pass through, and the blue light and the fluorescent light are sequentially incident on the colored light segments with the rotation of the color wheel, and colored light of two or more of color bands are allowed to pass through the dichroic layer and be output in a time-division manner.

* * * * *